United States Patent [19]

de Nora et al.

[11] Patent Number: 5,676,807
[45] Date of Patent: Oct. 14, 1997

[54] CARBON CONTAINING RAMMING PASTE IN ALUMINUM PRODUCTION CELLS

[75] Inventors: Vittorio de Nora, Nassau, Bahamas; Jainagesh A. Sekhar, Cincinnati, Ohio

[73] Assignee: Moltech Invent S.A.

[21] Appl. No.: 630,258

[22] Filed: Apr. 10, 1996

Related U.S. Application Data

[63] Continuation of Ser. No. 307,702, filed as PCT/US93/05459 Jun. 11, 1993, Pat. No. 5,507,933, and a continuation-in-part of Ser. No. 897,726, Jun. 12, 1992, Pat. No. 5,413,689.

[51] Int. Cl.$^6$ ................................................. C25C 3/08
[52] U.S. Cl. .............. 204/243 R; 204/279; 204/294; 252/502; 252/503; 252/507; 252/508; 252/509
[58] Field of Search ..................... 204/243 R, 244–247, 204/294, 279; 252/502, 503, 506, 508–509, 507

[56] References Cited

U.S. PATENT DOCUMENTS

| | | |
|---|---|---|
| 2,728,109 | 12/1955 | Bonnot ................. 204/243 R X |
| 2,937,980 | 5/1960 | Schmitt et al. ........... 204/243 R X |
| 2,991,257 | 7/1961 | Smith-Johannsen . |
| 3,083,111 | 3/1963 | Nickerson . |
| 3,174,872 | 3/1965 | Fisher et al. . |
| 3,442,787 | 5/1969 | Landrum et al. . |
| 3,457,158 | 7/1969 | Bullough . |
| 3,558,450 | 1/1971 | Ashe, Jr. et al. . |
| 3,871,986 | 3/1975 | Reamey et al. .............. 204/243 R |
| 4,196,227 | 4/1980 | DuBois et al. . |
| 4,244,986 | 1/1981 | Paruso et al. . |
| 4,292,345 | 9/1981 | Kolesnik et al. . |
| 4,376,690 | 3/1983 | Kugler . |
| 4,427,540 | 1/1984 | Hsu et al. . |
| 4,439,382 | 3/1984 | Joo' et al. . |
| 4,445,996 | 5/1984 | Kawamata et al. . |
| 4,466,996 | 8/1984 | Boxall et al. . |
| 4,517,037 | 5/1985 | Francis et al. . |
| 4,534,837 | 8/1985 | Nicolas et al. . |
| 4,582,553 | 4/1986 | Buchta . |
| 4,595,545 | 6/1986 | Sane . |
| 4,599,320 | 7/1986 | Reeve et al. . |
| 4,600,481 | 7/1986 | Sane et al. . |
| 4,612,103 | 9/1986 | Dewing et al. . |
| 4,613,418 | 9/1986 | Dewing et al. . |
| 4,683,037 | 7/1987 | Duruz . |
| 4,726,995 | 2/1988 | Chiu . |
| 4,737,253 | 4/1988 | Gesing et al. . |
| 4,857,289 | 8/1989 | Nauroth et al. . |
| 4,919,771 | 4/1990 | Wilkening . |
| 4,921,731 | 5/1990 | Clark et al. . |
| 4,931,413 | 6/1990 | Weir et al. . |
| 4,935,265 | 6/1990 | Pike . |
| 4,944,991 | 7/1990 | Karas et al. . |
| 4,983,423 | 1/1991 | Goldsmith . |
| 5,071,533 | 12/1991 | de Nora et al. . |
| 5,071,674 | 12/1991 | Nogues et al. . |
| 5,135,621 | 8/1992 | de Nora et al. . |
| 5,137,749 | 8/1992 | Yamazaki et al. . |
| 5,203,971 | 4/1993 | de Nora et al. . |
| 5,310,476 | 5/1994 | Sekhar et al. . |
| 5,320,717 | 6/1994 | Sekhar . |
| 5,340,448 | 8/1994 | Sekhar et al. . |
| 5,342,491 | 8/1994 | Sekhar . |
| 5,364,513 | 11/1994 | Sekhar et al. . |
| 5,374,342 | 12/1994 | Sekhar . |
| 5,378,327 | 1/1995 | Sekhar et al. . |
| 5,397,450 | 3/1995 | Sekhar et al. . |
| 5,409,589 | 4/1995 | Sekhar . |
| 5,413,689 | 5/1995 | de Nora et al. . |
| 5,420,084 | 5/1995 | Morel . |
| 5,492,604 | 2/1996 | Ray . |
| 5,507,933 | 4/1996 | de Nora et al. . |
| 5,527,442 | 6/1996 | Sekhar et al. . |
| 5,534,119 | 7/1996 | Sekhar . |
| 5,534,130 | 7/1996 | Sekhar . |

FOREIGN PATENT DOCUMENTS

| | | |
|---|---|---|
| 0145412 | 11/1984 | European Pat. Off. . |
| 0233398 | 8/1987 | European Pat. Off. . |
| 0367372 | 5/1990 | European Pat. Off. . |
| 2635337 | 2/1990 | France . |
| 3802670 | 8/1989 | Germany . |
| 2011361 | 7/1979 | United Kingdom . |
| 2094346 | 9/1982 | United Kingdom . |
| 2155484 | 9/1985 | United Kingdom . |
| 9325731 | 12/1993 | WIPO . |
| 9424337 | 10/1994 | WIPO . |

OTHER PUBLICATIONS

C. Ozaki and K. Tasumi, Change of the Physical Properties and The Structure in Carbon Materials Under Electrolysis Test, Light Metals 1992, Edited by Euel R. Cutshall, The Minerals, Metals & Materials Society, 1991, pp. 759–764.
Jilai Xue and Harald A. Oye, Sodium and Bath Penetration Into TiB$_2$–Carbon Cathodes During Laboratory Aluminuim Electrolysis, Light Metals 1992, Edited by Euel R. Cutshall, The Minerals, Metals & Materials Society, 1991, pp. 773–778.
Jörg Mittag, E. Bernhauser and H. Friedli, Sodium, Its Influence on Cathode Life in Theory and Practice, Light Metals 1992, Edited by Euel R. Cutshall, The Minerals, Metals & Materials Society, 1992, pp. 789–793.
Patent Abstracts of Japan, vol. 5, No. 012 (C–040)—Jan. 24, 1981.
Chemical Abstracts, vol. 108, No. 10, abstract No. 80756n—Mar. 7, 1988.
WPI/Derwent—AN 78–52047A—Mar. 1, 1978.
WPI/Derwent—AN 85–280492—Sep. 28, 1985.
WPI/Derwent—AN 84–142629—Apr. 24, 1984.
JM. Peyneau, Jr. Gaspard and D. Dumas, B. Samanos, Laboratory Testing of the Expansion Under Pressure Due to Sodium Intercalation in Carbon Cathude Materials for Aluminum Smelters, Light Metals 1992, Edited by Euel R. Cutshall, The Minerals, Metals & Materials Society, 1991.

*Primary Examiner*—Donald R. Valentine
*Attorney, Agent, or Firm*—Dinsmore & Shohl LLP

[57] ABSTRACT

An electrolytic cell for electrolysis of alumina for the production of aluminum, comprising at least two cell components joined by a ramming paste consisting essentially of a compact mixture of one or more particulate carbonaceous material(s) with a non-carbonaceous non-polluting colloidal binder and optionally with one or more non-carbonaceous fillers, the binder being a suspension of one or more colloids, or being derived from one or more colloid precursors or colloid reagents optionally with one or more chelating agents.

47 Claims, No Drawings

CARBON CONTAINING RAMMING PASTE IN ALUMINUM PRODUCTION CELLS

This application is a continuation application of U.S. application Ser. No. 08/307,702, filed Sep. 27, 1994, now U.S. Pat. No. 5,507,933, issued Apr. 16, 1996, which is a 35 USC § 371 filing of PCT/US93/05459, filed Jun. 11, 1993 and a continuation-in-part of U.S. application Ser. No. 07/897,726, filed Jun. 12, 1992, now U.S. Pat. No. 5,413,689.

FIELD OF THE INVENTION

The invention relates to a carbon containing paste for use in particular as components of electrolytic cells as such or compacted to form anodes, cathodes and cell linings of cells for the electrolysis of alumina for the production of aluminum, as well as masses, bodies and cell components obtained by solidifying this paste, methods of manufacturing cell components and other bodies, and their application in particular as cell components for aluminium production. The invention also pertains to the carbon containing paste and resulting solidified bodies for other uses.

BACKGROUND OF THE INVENTION

Aluminium is produced by the electrolysis of alumina dissolved in molten cryolite. The electrolytic cell known as the Hall-Hèroult cell, uses anodes consisting of a compacted mixture of petroleum coke and pitch. The cathodes are made from carbon blocks which are predominantly anthracite, metallurgical coke, graphite and pitch and form the cell bottom and the cell walls.

Although significant technological refinements in the cell design and construction have been made, the basic process of producing aluminium still remains substantially similar to what it was one hundred years ago. Carbonaceous materials are still the main lining used today in the cell.

The carbon anode blocks are consumed during electrolysis and must be replaced every four or five weeks of operation in standard cells. The oxygen resulting from the decomposition of alumina burns the carbon anode at a theoretical rate of approximately 330 kg per ton of aluminium produced, but in practice the carbon consumption is about 450 kg per ton of aluminium due to side reactions. This results in the emission of carbon oxides, sulfur oxides and other undesirable gases which are now being recognized as major atmosphere pollutants, but such emissions are considerably less dangerous and less polluting than those produced during fabrication of the carbon anodes with pitch as a binder.

At present, the method of producing carbon blocks to be used as anodes and cathodes in aluminium production cells consists of mixing petroleum coke with pitch for the anode and anthracite and other carbonaceous material with pitch for the cathode, followed by compacting, then calcining. Calcining designates a baking process in which volatiles are driven off at high temperatures without fusing the material.

The fabrication of the carbon anodes and cathodes involves the use of pitch. During fabrication, gases are emitted especially from the pitch during the long period required for calcining the blocks. These gases are polluting and very dangerous to the environment and are recognized as a major hazard to the health of workers involved in the production.

The pitch serves as the binder for the dry mixture of carbonaceous materials. Unfortunately, the pitch binder presents a series of serious hazards for health and for the environment.

Both solid and liquid pitch is used. The utilization of solid pitch results in unsatisfactory working conditions for the workmen, such as irritation and itching of the skin and eyes, and special precautions must be taken in order to protect the workmen during all operations where pitch is involved.

Additional problems result from the utilization of liquid pitch, particularly in regard to the storage and transpiration to the utilization plant.

During the calcining of the carbon blocks, which is required to eliminate the volatile components and stabilize the blocks, there is an emission of aromatic polycyclic hydrocarbons (PAH), which are very dangerous to the health and special equipment is required to absorb these products. However, the residual products after absorption are also difficult to eliminate and the cost of disposal is high.

Utilization of pitch as a binder requires the mixing operations with carbonaceous materials to be carried out at about 150°–200° C. and this creates operating complications and high operating costs.

The calcining process is complicated and costly and large furnaces are required which are difficult to operate, are polluting and expensive because of the high energy consumption. On account of the requirement of low thermal gradients during heating of these blocks to over 1000° C. and later cooling, the calcining operation normally takes as long as 2 to 4 weeks.

An additional disadvantage of the pitch is due to the fact that when the blocks are calcined the pitch is transformed mainly into a form of carbon which oxidizes more rapidly than the petroleum coke. This leads to disintegration of the anode block with formation of unutilized carbon powder which is detrimental to the operation of the electrolytic cell and increases the carbon consumption.

It would therefore be extremely advantageous for the aluminium industry to produce carbon blocks fabricated with a non-polluting binder without the necessity of handling pitch or like dangerous materials, avoiding the emission of polluting substances. Additionally, there is a need to develop compositions and methods which eliminate the high temperature fabrication and the long calcining times required to form the carbon blocks following the current state of the art.

SUMMARY OF THE INVENTION

This invention aims to eliminate the use of pitch or to at least drastically reduce the dangerous and consequently damaging emission of gases during the traditional fabrication and calcining of carbon blocks.

One main aspect of the invention is a carbon containing paste for use in particular as components of electrolytic cells as such or compacted to form anodes, cathodes and cell linings of cells for the electrolysis of alumina for the production of aluminium in Hall-Hèroult cells using prebaked or Soderberg-type anodes. The past according to the invention consists essentially of a compact mixture of one or more particulate carbonaceous material(s) with a non-carbonaceous non-polluting binder and optionally with one or more fillers, the binder being a suspension of one or more colloids or being derived from one or more colloid precursors, colloid reagents or chelating agents.

The binder may advantageously be a suspension containing colloidal silica, alumina, yttria, ceria, thoria, zirconia, magnesia, lithia and related hydroxides, acetates and formates thereof, as well as oxides and hydroxides of other metals, cationic species and mixtures thereof.

The colloidal binder can also be derived from a suspension containing colloid precursors and reagents which are solutions of at least one salt such as chlorides, sulfates, nitrates, chlorates, perchlorates or metal organic compounds such as alkoxides, formates, acetates of silicon, aluminum, yttrium, cerium, thorium, zirconium, magnesium, lithium and other metals and mixtures thereof. Such solutions of metal organic compounds, principally metal alkoxides, may be of the general formula $M(OR)_z$ where M is a metal or complex cation made up of two or more elements, R is an alkyl chain and z is a number, usually in the range 1 to 12. Such metal organic compounds are alternatively described as solutions whose molecules have organic groups bound to a metal atom through oxygen. Examples are silicon tetraisomyloxide, aluminum butoxide, aluminum isopropoxide, tetraethyl orthosilicates, etc. Formates, acetates and acetylacetonates are also considered in this category.

The colloidal binder will usually be a relatively dilute aqueous or non-aqueous suspension, but the use of concentrated colloids or partly or fully precipitated colloids is also possible.

In the production method of the paste, the addition of bases to aluminium salt solutions causes the precipitation of aluminium hydroxides. Hydrolysis of aluminium sulfate acidic solutions results in the colloidal dispersion of amorphous aluminium hydrous oxides, similarly the hydrolysis of an aluminium alkoxide results in an aluminium containing colloid. Aluminum sulfate solutions reacted with urea and subsequent heat treatment may also yield colloids as do the hydrolysis of aluminium chloride and perchlorate salt solutions at 125° C.

Alternatively, the colloidal binder is derived from a suspension containing also chelating agents such as acetyl acetone and ethylacetoacetate.

For the production of anodes in aluminium production cells, the paste of the invention advantageously comprises one or more fillers selected from antioxidant or oxidation prevention material such as boric acid and its salts, and fluorides, or from bonding enhancing materials such as methyl-cellulose, particulate alumina or urea. It is also possible to include one or more fillers in particular ceramics such as ceramic oxides and oxycompounds but possibly also metallic, intermetallic, semi-metallic, polymeric and/or refractory materials including borides, carbides, nitrides, silicides, oxynitrides, and mixtures of all of the aforesaid materials.

Particularly for the production of cathodes or for application as a cathode paste in aluminium production cells, the paste of the invention may comprise one or more fillers selected from metallic, intermetallic, semi-metallic, polymeric, refractory and/or ceramic materials such as borides, carbides, nitrides, silicides, oxides, oxynitrides, as well as pyrolyzable chlorosilanes, polycarbosilanes, polysilanes and other organometallic polymers which pyrolyze to useful products for oxidation prevention or enhancing bonding, or their pyrolyzed products; thermosetting resins; thermoplastic resins; and mixtures thereof.

Examples of thermosetting resins are epoxides, phenolic resins and polyimides. Examples of thermoplastic resins are polycarbonates, eg. Lexan™, polyphenylene sulfides, polyether ether ketones, polysulfones, eg. Udel™, polyetherimides and polyethersulfones.

For both anode and cathode applications and for conductive pastes for bonding together carbon parts, a particularly advantageous filler is aluminium, in the form of particulates, chips, turnings or ground scrap pieces, or mixtures thereof.

Some materials may be present both as binders and as fillers. For instance, alumina in colloidal form can be present in the binder, while particulate alumina is included as a filler. The same applies to aluminium which can be present for example as colloidal aluminium monophosphate in the binder and as particulates chips, turnings or ground scrap pieces in the filler.

Advantageously, the binder comprises colloidal alumina, in combination with a filler consisting mainly of alumina or aluminium, or a mixture thereof, possibly with small quantities of other fillers such as boric acid.

The particulate carbonaceous materials are preferably selected from petroleum coke, metallurgical coke, anthracite, graphite or any other form of crystalline carbon, amorphous carbon or a mixture thereof, preferably petroleum coke for the production of anodes and anthracite, metallurgical coke, graphite and other carbon materials for the production of cathodes. Additionally, the carbon may be a fullerene such as fullerene $C_{60}$ or $C_{70}$ or of a related family. Mixtures of these different forms of carbon can also be used.

The size of the particulate carbonaceous material is usually below 40 mm, preferably between 1 micrometer and 30 mm, and the particulate carbonaceous material preferably contains between 5 weight % and 40 weight % of particles having a size below 0.2 mm.

However, the paste of the invention may contain particulate carbonaceous material, fillers or binders that are fibrous, both discrete (chopped) fibers and continuous or discontinuous lengths of fibers. Fibers have the advantage of enhancing bonding and improving toughness, hence the solidity of the resulting bodies or masses. Mixtures of powders and fibers are also contemplated.

The paste can also be used to produce relatively thick fibers (1 to 5 mm diameter), both short fibers and continuous lengths. These pre-formed fibers may then be mixed with the colloidal binder, possibly with particulate carbonaceous materials and optional non-carbonaceous fillers, into a paste to produce a fiber-reinforced body.

The paste according to the invention can also be applied to pre-forms of carbonaceous materials, aluminium, alumina or other refractory materials, in the form of honeycombs, reticulated foams, fabrics, felts, etc. which serve as a core or as a reinforcement for the finished body.

In most embodiments, the paste of the invention contains 50 to 99 weight % of carbonaceous materials (preferably 50 to 95%), 0 to 30 weight % of fillers and 1 to 30 weight % of the binder (preferably 5 to 30%). The mentioned weights of the binders are in the dry form; therefore, the same weight proportions apply also to the dried bodies or masses obtained from the paste.

In other embodiments, particularly when aluminium is as filler, the paste of the invention contains 50 to 98 weight % of carbonaceous materials (,preferably 50 to 90%), 1 to 60 weight % of fillers (preferably 5 to 50%, usually predominantly aluminium or an aluminium/alumina mixture optionally with small amounts of other binders such as boric acid) and 1 to 30 weight % of the binder, preferably 5 to 30%, and preferably colloidal alumina. High amounts of aluminium as filler, eg. from 40–60 weight %, are useful especially when the paste is used as a conductive bonding material.

The paste of the invention can have different fluidities during its production, handling, storage and transport. Its viscosity may range from about $10^{-1}$ to $10^{15}$ cP, i.e. from quite fluid to solidified masses ready for use. For costs reasons, it is desirable to minimize the quantity of the liquid carrier. Therefore controlled viscous forms of the paste are usually preferred, i.e. with a viscosity in the range $10^1$ to $10^3$ to cP.

Another aspect of the invention is a cell component of an electrolytic cell for the electrolysis of alumina for the production of aluminium, such as an anode, a cathode or a cell lining, comprising a solidified carbon containing paste according to the invention as discussed above. The cell component may be in the form of a self-supporting block or in the form of a cell lining. Such cell lining can be a massive body formed by the solidified paste or can be made of several blocks joined by a solidified mass of the same paste.

The cell component may be an anode block, in which case its side surfaces may advantageously be coated with an oxidation-resistant coating. For anode applications, it is advantageous for the carbon block to contain aluminium and/or alumina in the colloidal binder and/or as filler. As the anode is consumed in use, the alumina it contains provides a source of the material to be electrolyzed at locations where it is most important. In particular, when the alumina in the electrolyte is depleted due to insufficient replenishment from an external supply, the alumina from the anode will serve to prevent anode effects by maintaining a sufficient alumina concentration in the electrolysis space.

For both anode and cathode applications, the carbon mass can be a self-sustaining generally rectangular block, but it is also possible to form the mass as a body in-situ in an aluminium production cell, as a cell bottom or wall or as a complete cell lining, or the paste can be continually fed as it is used, in the manner of a Soderberg anode fed at a rate to compensate for carbon consumption. When a cell bottom is made of pre-formed blocks, these blocks can be assembled in the cell using the paste with the non-polluting, non-carbonaceous binder like a ramming paste. The carbon paste can also be formed into fibers or filaments.

When the cell component is a cathode its surface which in use contacts molten aluminium can be coated with a coating of an aluminium-wettable refractory material. Such coating can be applied before or after the final baking. Suitable coatings and their application by micropyretic reactions are described in PCT/EP93/00811.

The cell components may comprise a pre-formed body of solidified paste joined to a current-connecting member by a solidified mass of the paste which is conductive and also provides structural support around the joint. If necessary, such joints may be reinforced.

A method according to the invention of producing a carbon body or mass for use in particular as component of electrolytic cells such as an anode or cathode for the production of aluminium by the electrolysis of alumina comprises forming the paste of the invention to a desired shape and size, compacting and drying before use.

The paste of the invention may for example be compacted by pressing into the desired shape in a mold at a pressure between about 0.24 to 4.7 MPa (0.1 to 2 tons/cm$^2$), or may be compacted by vibration and/or the application of pressure in a mold or extrusion die of the desired shape and size. The compaction may also be carried out by tamping the paste in cell bottom acting as mold.

Optionally, the particulate carbonaceous material is mixed with a filler before mixing with the binder to form the paste. If necessary, the carbonaceous material is dried before mixing with the fillers. Also, the paste can be partially dried before molding and compacting.

Before use the body is dried by subjecting it to heat treatment at a temperature from 50° C. to 300° C., preferably from 150° C. to 200° C., i.e. at temperatures much below those used in the traditional calcining process. For certain applications, however, much higher temperatures can be used.

To form self-supporting blocks, the past is formed into the required shape, compacted and dried. But the paste may also be formed into shape, compacted and dried in an aluminium production cell, thus forming for instance a cell bottom and/or side-walls in situ.

After making a block or mass, the block or mass may be subjected to an additional impregnation of a colloid based slurry and heated again. It is also possible to coat the block or mass with a coating of desired composition including, in particular for cathode applications, coatings of an aluminium wettable material such as titanium diboride or other refractory metal borides, carbides, nitrides etc.

For carbon blocks or masses subject to oxidizing or corrosive environments, the coating may be a protective coating which improves the resistance of the body to oxidation, and which may also enhance the bodies electrical conductivity and/or its electrochemical activity, such coating being applied from a colloidal slurry containing reactant or non-reactant substances, or a mixture of reactant and non-reactant substances, which when the body is heated to a sufficient elevated temperature react and/or sinter to form the protective coating. Such coatings, which in preferred compositions comprise carbides, silicides, borides, nitrides, oxides, nitrides, carbonitrides, oxynitrides and combinations of these, in particular SiC and MoSi$_2$, possibly together with metallic particles such as for example Ni, Pt, Al, Cr or intermetallic particles such as for example NiAl, NiAl$_3$, CrSi, CrB etc. or combinations thereof, as well as the reaction products of micropyretic agents which are particles, fibers or foils of materials such as Ni, Al, Ti, B, Si, Nb, C, Cr$_2$O$_3$, Zr, Ta, TiO$_2$, B$_2$O$_3$, Fe or combinations, are described in PCT/EP93/00810.

The invention also concerns carbon bodies or masses obtained by compacting and drying the paste according to the invention, and the use of such bodies or masses as components of electrolytic cells, such as an anode or cathode block for the electrolysis of alumina for the production of aluminium.

Another aspect of the invention is a carbon body for use in particular as component of electrolytic cells such as an anode or cathode block for the electrolysis of alumina for the production of aluminium, which consists essentially of a compacted mixture of one or more particulate carbonaceous materials and a finely dispersed non-carbonaceous, non-polluting binder possibly with one or more fillers, in which the binder is derived from a suspension containing one or more colloids, colloid precursors or colloids reactants possibly with chelating agents.

An electrolytic cell for the electrolysis of alumina for the production of ahminium according to the invention comprises a cell component made of a carbon containing paste or a solidified carbon containing paste as discussed above. The cell component can be a Soderberg type anode formed of this paste which is continuously supplied at a rate corresponding to the consumption of the carbon; a cell lining formed of a solidified mass of the paste, or formed of prefabricated blocks of solidified paste jointed by a solidified mass of the paste acting as ramming paste; consumable anode blocks; cathode blocks for assembly into a cell bottom; a ramming paste joining other carbonaceous cell components, etc.

The paste, methods and body according to the invention have numerous advantages stemming from the elimination of the pitch binder, including:

1) Elimination of pitch and the associated drawbacks for the storage, transport and handling of pitch.

2) Economizing the cost of the pitch itself and of the installation for its storage and handling.

3) Elimination of the tar residues from the filters in the baking furnaces which are difficult and costly to dispose of.

4) Simplification of the plants which are used today, particularly by the elimination of the hot mixing and the high calcining temperature.

5) Possibly to utilize part of the plants existing today, with the advantage of drastically reducing the operating cost of existing plants and the investments required for new plants.

6) Elimination of the costly and length calcining phase and the pollution deriving from the emission of PAH.

7) Reduction of the production cycle from 3 to 4 weeks to 1 to 3 days or less.

8) More uniform oxidation of the material when used as anodes.

DETAILED DESCRIPTION

Preparation of Carbon Blocks or Cell Linings with the New Binder

The preparation of carbon blocks or other bodies with the new binder consists primarily of the following phases:

a) Preparation of dry mixtures of the required particle size of the carbonaceous materials: petroleum coke for the anodes, or anthracite, metallurgical coke, graphite and other carbon materials for the cathodes;

b) Careful mixing of the carbonaceous material with chosen, optional fillers, such as boric acid and its salts and aluminium fluoride, to reduce and normalize oxidation of the anodic carbon or addition of other additives to enhance bonding, such as methyl cellulose, alumina and other oxides.

c) Addition of the non-carbonaceous binder until perfect mixing and homogenization of the fluid paste.

d) Compacting of the fluid paste to the desired shape and size by means of pressing, extrusion and/or vibration, either in generally rectangular molds to form blocks, or the fluid paste can be poured as such into an electrolytic cell where it can be conveniently compacted.

e) Drying of the carbon blocks in one or more steps, including possible partial drying of the paste before or during compacting, or drying of the poured paste to eliminate the excess of liquid.

The method of preparation of the paste and of the blocks is different from the traditional method utilized so far in as much as the binder is not made of pitch. Therefore, all operations for preparation of the mixtures, addition of the binder and compacting may be carried out at room temperature instead of that required by the melting point of pitch. Consequently, the calcining, that is usually carried out at above 1000° C. and for a total period of 2 to 4 weeks and which must be carried out in a non-oxidizing atmosphere obtained by protecting the carbon blocks with suitable carbonaceous materials to protect the carbon from oxidation, can take place at a much lower temperature sufficient to eliminate the excess liquid, though high temperatures baking need not be ruled out altogether, particularly because there is no emission of polluting gases.

The production process of carbon blocks or other bodies for aluminium production applications is described below. A supply of carbonaceous material is if necessary dried in a drier. Drying is necessary for metallurgical coke, but is not always necessary for other grades of carbonaceous materials. If the carbonaceous material is not already supplied ground to the required particle size, it is crushed to the required size and screened in a crusher where it may be combined with scrap carbonaceous materials, coming from production scrap of compacted bodies, or from the re-processing of non-consumed parts of anodes or other cell components after use.

The carbonaceous material leaving the crusher is a dry, uniform particulate with particle size up to 40 mm, preferably between 1 micrometer and 30 mm, and is blended with optional fillers in a blender which may be a separate unit, or may be combined with a mixer in which the carbonaceous material, optional filler(s) and colloidal non-carbonaceous binder(s) are mixed to form a homogenized fluid paste.

As necessary, the paste leaving mixer is dried in an over to bring it to the required viscosity for delivery to mold. This mold may be a mold or injection die, or may be a cell bottom in which the paste is compacted. This mold may be at the same location as the paste-production units described previously, or it may be at a remote location, such as at the site of an aluminium production plant. In the latter case, the paste of the invention is transported in tanks which can remain at ambient temperature.

After compacting and shaping in the mold, which may be combined with drying of the paste, the compacted body is dried as necessary and may be subjected to optional treatments. Such optional treatments include super drying or special heat treatments under an inert or a reducing atmosphere; impregnation of the compacted body with the same or a different colloidal binder, followed by heating; coating of the compacted body with a suitable coating on some or all of its surfaces; and securing current collectors and the like to the body by means of the traditional rodding process, or using the paste of the invention to secure the current collectors.

The following examples further illustrate the invention.

EXAMPLE I 40 ml 10 T HCl in aqueous solution was added to 50 g of petroleum coke (particle size 10–200 micrometer, average approximately 60 micrometer) and stirred for a sufficient time to wet the petroleum coke particles, followed by drying at 200° C. for approximately 2 hours to dry the petroleum coke completely.

80 ml of colloidal alumina (AL-20 grade, 20% solid alumina) was added to the dried acidified petroleum coke and stirred well. The resulting slurry of petroleum coke, colloid alumina and HCl mixture was then dried at 200° C. in an air furnace for approximately 2 to 3 hours to produce a paste.

The same procedure was repeated several times more, but instead with the addition of 120 ml or 250 ml of the colloidal alumina.

The resulting pastes were pressed at 8200 psi into cylinder form. In the pressing process, some liquid was squeezed out. The cylinders were then held at 200° C. in an air furnace until dried.

Some samples were baked in an inert atmosphere (argon) or a reducing atmosphere (CO) at a final temperature of 500° C. and 1000° C. maintained overnight.

The cylinders produced by the pressing operation all exhibited good formability: no signs of cracking or tendency to crumble. The dried and baked cylinders all had good strength. The cylinders made using 250 ml of colloidal alumina had a particularly good strength.

One of the cylinders dried at 200° C. was used as an anode in a laboratory scale aluminium production cell at a current density of 0.7 A/cm². Electrolysis was continued for 12 hours. During this time the anode operated satisfactorily with normal consumption of the carbon, and at the end of the test it showed no sign of disintegration.

EXAMPLE II 50 g of petroleum coke (particle size in the ranges 10–100 micrometer) was added to 80 ml of colloidal alumina (AL-20 grade, 20% solid alumina) and stirred well. The resulting slurry of petroleum coke and colloid alumina was then dried at 200° C. in an air furnace for approximately 2 hours to produce a paste.

The same procedure was repeated but with the addition of 30 ml, 120 ml or 250 ml of the colloidal alumina.

The resulting pastes were pressed at 56.5 MPa (8200 psi) into cylinder form. In the pressing process, some liquid was squeezed out. The cylinders were then heated at 200° C. in an air furnace until dried.

Some samples were baked in an inert atmosphere (argon) or a reducing atmosphere (CO) at a final temperature of 500° and 1000° C. maintained overnight.

The pressed cylinders exhibited good formability: no signs of cracking or tendency to crumble. The dried and baked cylinders had good strength.

The same procedures repeated with the addition of 80 ml or 120 ml of Nicol™ colloidal cerium acetate instead of colloidal alumina produced similar results.

EXAMPLE III

Example II was repeated for two 50 g specimens composed respectively of a particulate mixture of (a) 84 wt % petroleum coke, 15 wt % particulate alumina, and 1 wt % $B_2O_3$ (particle sizes all approximately 1 micrometer); and (b) 94 wt % petroleum coke (10–100 micrometer), 5 wt % particulate alumina (1 micrometer), and 1 wt % $B_2O_3$ (1 micrometer);

which were pre-mixed prior to the addition of 80 ml of colloidal alumina, followed by the same stirring, pressing and drying operations. The pressed cylinders exhibited good formability and had superior strength after the 200° C. drying.

EXAMPLE IV

Example II was repeated on several samples using 50 g of metallurgical coke and employing 20 ml of Nicol™ colloidal cerium acetate instead of colloidal alumina. The final drying was carried out at 300° C. The cylinders produced by the pressing operation exhibited good formability and good strength after drying.

EXAMPLE V

Example I was repeated except that the initial 50 g specimen was composed of a particulate mixture of 84 wt % petroleum coke (1–200 micrometer), 15 wt % $Al_2O_3$ (3 micrometer) and 1 wt % $B_2O_3$ (1 micrometer) which was pre-mixed prior to the addition of the HCl followed by drying, addition of the 80 ml of colloidal alumina, and then the same stirring, pressing and drying operations.

One specimen produced this way was impregnated after drying with the paste containing petroleum coke, alumina particles, $B_2O_3$ and colloidal alumina by dipping it in the paste, allowing the paste to infiltrate and then dried again at 200° C.

Another specimen produced this way was impregnated with colloidal cerium acetate by dipping the dried cylinder in the colloid, then drying it again at 200° C.

EXAMPLE VI

Example II was repeated except that the initial 50 g specimen was composed of a particulate mixture of 70 wt % petroleum coke (1–200 micrometer) and 30 wt % alumina (3 micrometer). A pasty slurry was formed by adding 20 ml of colloidal alumina (AL-20 grade, 20% solid alumina) and this pasty slurry of petroleum coke, alumina and colloid alumina was directly pressed at 56.5 MPa (8200 psi) into cylinder form, without pre-heating. The cylinder was then dried at 200° C. in an air furnace for approximately 10 hours. The resulting cylinder exhibited good formability and good strength after drying.

EXAMPLE VII

Example VI was repeated except that the initial 50 g specimen was replaced by mixtures of:

79 wt % petroleum coke (1–200 micrometer), 20 wt % particulate alumina (10 micrometer), and 1 wt % $B_2O_3$ (1 micrometer); and 84 wt % petroleum coke (1–200 micrometer), 15 wt % particulate alumina (10 micrometer), and 1 wt % $B_2O_3$ (1 micrometer).

After the addition of 20 ml of colloidal alumina, each mixture was stirred, pressed without pre-drying and then dried in air at 200° C. The resulting cylinders exhibited good formability and good strength after drying.

EXAMPLE VIII

Example II was repeated except that the initial 50 g of petroleum coke was replaced by a mixture of 80 wt % petroleum coke and 20 wt % amorphous carbon, and the colloid was a mixture of 20 ml colloidal alumina and 20 ml colloidal cerium acetate. As before, the resulting cylinder exhibited good formability and good strength after drying.

EXAMPLE IX

Example VI was repeated except that the initial 50 g of petroleum coke was replaced by a mixture of 84 wt % petroleum coke, 15 wt % particulate alumina, and 1 wt % $B_2O_3$ and the colloid was 20 ml Nicol™ colloidal cerium acetate, and the paste was pressed without pre-baking. As before, the resulting cylinder exhibited good formability (though with some slight surface cracking) and had good strength after drying.

EXAMPLE X

Example II was repeated except that the initial 50 g of petroleum coke was replaced by mixtures of:

(c) 83 wt % petroleum coke (1–200 micrometer), 15 wt % particulate alumina (10 micrometer), 1 wt % $B_2O_3$ (1 micrometer) and 1 wt % $AlF_3$ (1 to 10 micrometer); and (d) 78 wt % petroleum coke (1–200 micrometer), 20 wt % particulate alumina (10 micrometer), 1 wt % $B_2O_3$ (1 micrometer) and 1 wt % $AlF_3$ (1 to 10 micrometer).

After the addition of a mixture of 10 ml colloidal alumina with 10 ml colloidal cerium acetate, each mixture was part dried at 200° C., stirred, pressed and then heated in air at 200° C. until dry. The resulting cylinders exhibited good formability and superior strength after drying.

EXAMPLE XI

Example VI was repeated except that the initial 50 g of petroleum coke was replaced by mixtures of:

(e) 83 wt % petroleum coke (1–200 micrometer), 15 wt % particulate alumina (3 micrometer), 1 wt % $B_2O_3$ (1 micrometer) and 1 wt % $AlF_3$ (1 to 10 micrometer); and (f) 78 wt % petroleum coke (1–200 micrometer), 20 wt % particulate alumina (3 micrometer), 1 wt % $B_2O_3$ (1 micrometer) and 1 wt % $AlF_3$ (1 to 10 micrometer).

Pasty slurries were formed by adding 20 ml of colloidal alumina to each mixture which was then directly pressed at 56.5 MPa (8200 psi) into cylinder form, without pre-heating. The cylinder was then heated at 200° C. in an air furnace for approx. 10 hours. The resulting cylinders both exhibited superior formability and superior strength after drying.

EXAMPLE XII

Example VI was repeated except that the initial 50 g specimen was replaced by mixtures of:

(g) 80 wt % petroleum coke (1–200 micrometer) and 20 wt % particulate alumina (10 micrometer); and (h) 99 wt % petroleum coke (1–200 micrometer) and 1 wt % $B_2O_3$ (1 micrometer).

To the mixtures were added 10 ml of colloidal alumina and 10 ml of a 2% aqueous solution of methyl cellulose. Each mixture was stirred, pressed without pre-drying and then baked in an inert or reducing atmosphere at 1000° C. for approximately 11 hours. The resulting cylinders exhibited good formability and superior strength after baking.

EXAMPLE XIII

Pastes, particularly for application as ramming paste, bonding paste, for the production of fibers, or for cathodic applications, were prepared with the compositions shown in Table I.

TABLE I

|  | A | B | C | D | E |
|---|---|---|---|---|---|
| Anthracite or graphite (g) | 3 | 2 | 3 | 1 | 1 |
| Colloidal alumina (ml) | 2 | 2 | 4 | 4 | 1.5 |
| Metallurgical coke (g) | 2 | 2 | 3 | 2 | 4 |

These pastes were prepared as in Example II. The resulting pastes A, B, C and E were relatively viscous. Paste D was relatively fluid. All these pastes could be processed into bodies as described in the previous examples, or into fibers by extrusion.

EXAMPLE XIV 2 g of 99.5% pure aluminium powder, −325 mesh (<42 micrometer), were mixed with 9 g of anthracite powder, −12 mesh (<1680 micrometer), and 9 g of anthracite powder, about −80 mesh (<177 micrometer), and the mixture was well blended. 2 ml of Al-20 grade colloidal alumina was added to the mixture and stirred well. The mixture composition was about 9 wt % aiuminium, about 80 weight % carbon and about 11 weight % colloidal alumina.

The mixture was pressed at 9.9–17.2 MPa (1440–2500 psi) in a die of about 2.5 cm diameter, and the pressed cylinder baked at 1000° C. for about 30 minutes, then immersed in carbon powder (to prevent oxidation) for about 30 minutes, and allowed to cool in air.

EXAMPLE XV 5.4 g of 99.5% pure aluminium powder, −325 mesh (<42 micrometer), were mixed with 24.6 g of anthracite powder, (Sigri premixed anthracite powder) and the mixture was well blended. 3 ml of a colloid (1 ml of AL-20 grade colloidal alumina in 2 ml water) was added to the mixture and stirred well. The mixture composition was about 17 wt % aluminium, about 79 wt % carbon and about 4 weight % colloidal alumina.

The mixture was pressed at 55.1 MPa (8000 psi) in a die of about 2.5 cm diameter, and the pressed cylinder baked at 1000° C. for about 30 minutes, then immersed in carbon powder (to prevent oxidation) for about 30 minutes, and allowed to cool in air.

EXAMPLE XVI

Cathode pastes for joining together carbon cathode blocks were pared as follows.

Slurries were prepared by mixing powdered graphite (GR) or powdered anthracite (AN) with powdered aluminium (Al) with the compositions indicated in Table II, 10 g of each of these mixtures then being mixed with the indicated quantity of AL-20 grade colloidal alumina, and stirred well to form a pasty slurry.

TABLE II

| Mixture composition (g) | | | ml of AL-20 per 10 g |
|---|---|---|---|
| GR | AN | Al | mixture |
| 4 | — | 6 | 10 |
| 5 | — | 5 | 10 |
| 6 | — | 4 | 10 |
| 7 | — | 3 | 10 |
| — | 5 | 5 | 4 |
| 1 | 5 | 4 | 3.5 |
| 2 | 5 | 3 | 3 |
| 3 | 5 | 2 | 2.5 |

The resulting slurries were applied on the surfaces of two carbon cathode blocks, the blocks placed together and the paste allowed to dry in air for 30 minutes to 2 hours. The blocks were then heated to 1000° C. for 15 minutes, using graphite powder where necessary to prevent oxidation. The carbon cathode blocks were firmly bonded together by the dried electrically-conductive paste.

Industrial Applicability & Modifications

As set out above, a main application of the invention is for electrochemical uses in particular as cell components in aluminium production. However, the invention also concerns a carbon containing body for general uses, obtained by solidifying a carbon containing paste consisting of a compact mixture of one or more particulate carbonaceous material(s) with a non-carbonaceous non-polluting colloidal binder and optionally with one or more non-carbonaceous fillers, the binder being a suspension of one or more colloids, or being derived from one or more colloid precursors and colloid reagents optionally with one or more chelating agents.

The paste of the invention and solidified bodies produced by the paste have many other applications including engineering materials used in diverse applications such as aircraft bodies, electrodes, heating elements, structural materials, rocket nozzles, metallurgical crucibles, pump shafts, furnace fixtures, sintering trays, induction furnace susceptors, continuous casting dies, ingot molds, extrusion canisters and dies, heat exchangers, anodes, high temperature insulation (porous graphite), gas diffusers, aerospace structural materials, bearings, substrates in electronics industry, brazing and joining fixtures, diamond wheel molds, nozzles, glass molds.

The paste can also be used as a bonding agent for such carbon parts, or parts of other materials.

Additional electrochemical applications include anodes for magnesium and sodium production and for chloralkali cells. The bodies can also be used as anodes for electric arc furnaces.

In a modification of the invention, it is possible for certain applications to include a small quantity of pitch, tar or similar carbonaceous binders in combination with the colloidal binder. The total content of the pitch, tar or other carbonaceous binder is usually about 1 to 3 wt % of the solids in the paste, up to a maximum of 6 wt %. This is, in any event, well below the usual quantity of 16 wt % used in conventional carbon block production. Thus, even if some pitch is included, the associated problems of pollution are greatly reduced. When a small amount of pitch is included, the paste must be baked adequately to drive off the volatiles. But because of the small quantity of pitch, the baking time will be reduced.

We claim:

1. A carbon containing ramming paste for use in joining components of electrolytic cells for the electrolysis of alumina for the production of aluminium, consisting essentially of a compact mixture of one or more particulate carbonaceous material(s) with a non-carbonaceous non-polluting colloidal binder and optionally with one or more fillers, the binder being a suspension of one or more colloids, or being derived from one or more colloid precursors or colloid reagents optionally with one or more chelating agents.

2. The ramming paste of claim 1, in which the binder is a suspension selected from the group consisting of colloidal silica, alumina, yttria, ceria, thoria, zirconia, magnesia, lithia and hydroxides, acetates and formates thereof as well as oxides and hydroxides of other metals, cationic species, colloidal aluminium monophosphate.

3. The ramming paste of claim 2, in which the binder is derived from colloid precursors of colloid reagents which are solutions of at least one salt such as chlorides, sulfates, nitrates, chlorates, perchlorates or metal organic compounds such as alkoxides, formates, acetates of silicon, aluminium, yttrium, cerium, thorium, zirconium, magnesium, lithium and other metals and mixtures thereof.

4. The ramming paste of claim 3, in which the binder contains a chelating agent such as acetyl acetone or ethylacetoacetate.

5. The ramming paste of claim 3, in which the solutions of metal organic compounds, principally metal alkoxides, are of the general formula $M(OR)_z$ where M is a metal or complex cation, R is an alkyl chain and z is a number.

6. The ramming paste of claim 1, wherein said filler is selected from the group consisting of antioxidant or oxidation prevention materials such as boric acid and its salts, and fluorides; bonding enhancing materials such as methylcellulose, particulate alumina or urea; metallic, intermetallic, semi-metallic, polymeric, refractory and/or ceramic materials such as borides, carbides, nitrides, silicides, oxides, oxynitrides, and mixtures thereof; pyrolizable chlorosilanes, polycarbosilanes, polysilanes and other organometal polymers which pyrolyze to useful products for oxidation prevention or enhancing bonding, or their pyrolyzed products; and mixtures thereof.

7. The ramming paste of claim 6, wherein said filler consists essentially of metallic aluminium, in the form of particulates, chips, turnings or ground scrap pieces, and mixtures thereof.

8. The ramming paste of claim 1, wherein the particulate carbonaceous materials are selected from the group consisting of petroleum coke, metallurgical coke, anthracite, graphite, amorphous carbon, fullerene and a mixture thereof.

9. The ramming paste of claim 8, in which the size of the particulate carbonaceous material is up to 40 mm.

10. The ramming paste of claim 9, in which the size of the particulate carbonaceous material is between 1 micrometer and 30 mm.

11. The ramming paste of claim 8, in which the particulate carbonaceous material contains between 5% and 40% of particles having a size below 0.2 mm.

12. The ramming paste of claim 1, in which at least part of the particulate carbonaceous material, and/or the binder and/or the filler is fibrous.

13. The ramming paste of claim 1, consisting essentially of 50 to 99 weight % of carbonaceous materials, 0 to 30 weight % of fillers and 1 to 30 weight % of the binder.

14. The ramming paste of claim 13, wherein said carbonaceous material is present at a level from 50 to 95% and wherein said binder material is present at a level from 5 to 30%.

15. The ramming paste of claim 13, wherein the filler is selected from the group consisting of aluminium, alumina or a mixture of aluminium and alumina, and the binder consists essentially of colloidal alumina and/or colloidal aluminium monophosphate.

16. The ramming paste of claim 15, in which the particulate carbonaceous material contains between 5% and 40% of particles having a size below 0.2 mm.

17. The ramming paste of claim 1, consisting essentially of 50 to 98 weight % of carbonaceous materials, 1 to 60 weight % of fillers and 1 to 30 weight % of the binder.

18. The ramming paste of claim 17, wherein said carbonaceous material is present at a level from 50 to 90%, wherein said fillers are present at a level from 5 to 50% and wherein said binder is present at a level and from 5 to 30%.

19. The ramming paste of claim 18, wherein said filler consists essentially of metallic aluminium.

20. The ramming paste of claim 1, consisting essentially of 50 to 90 weight % of carbonaceous materials, 1 to 60 weight % of fillers and 1 to 30 weight % of the binder.

21. The ramming paste of claim 20, wherein said filler consists essentially of metallic aluminium at a level from 40 to 60% and said binder is at a level from 5 to 30%.

22. An electrolytic cell for the electrolysis of alumina for the production of aluminium, comprising at least two cell components joined by a ramming paste consisting essentially of a compact mixture of one or more particulate carbonaceous material(s) with a non-carbonaceous non-polluting colloidal binder and optionally with one or more non-carbonaceous fillers, the binder being a suspension of one or more colloids, or being derived from one or more colloid precursors or colloid reagents optionally with one or more chelating agents.

23. The cell of claim 22, in which the binder is a suspension selected from the group consisting of colloidal silica, alumina, yttria, ceria, thoria, zirconia, magnesia, lithia and hydroxides, acetates and formates thereof as well as oxides and hydroxides of other metals, cationic species, colloidal aluminium monophosphate.

24. The cell of claim 23, in which the binder is derived from colloid precursors and reagents which are solutions of at least one salt such as chlorides, sulfates, nitrates, chlorates, perchlorates or metal organic compounds such as alkoxides, formates, acetates of silicon, aluminium, yttrium, cerium, thorium, zirconium, magnesium, lithium and other metals and mixtures thereof.

25. The cell of claim 24, in which the binder consists essentially of a chelating agent such as acetyl acetone or ethylacetoacetate.

26. The cell of claim 24, in which the solutions of metal organic compounds, principally metal alkoxides, are of the general formula $M(OR)_z$ where M is a metal or complex cation, R is an alkyl chain and z is a number.

27. The cell of claim 22, wherein said filler is selected from the group consisting of antioxidant or oxidation prevention materials such as boric acid and its salts, and fluorides; bonding enhancing materials such as methylcellulose, particulate alumina or urea; metallic, intermetallic, semi-metallic, polymeric, refractory and/or ceramic materials such as borides, carbides, nitrides, silicides, oxides, oxynitrides, and mixtures thereof; pyrolizable chlorosilanes, polycarbosilanes, polysilanes and other organometal polymers which pyrolyze to useful products for oxidation prevention or enhancing bonding, or their pyrolyzed products; thermosetting resins; thermoplastic resins; and mixtures thereof.

28. The cell of claim 27, wherein said filler consists essentially of metallic aluminium, in the form of particulates, chips, turnings or ground scrap pieces, and mixtures thereof.

29. The cell of claim 22, wherein the particulate carbonaceous materials are selected from the group consisting of petroleum coke, metallurgical coke, anthracite, graphite, amorphous carbon, fullerene and mixtures thereof.

30. The cell of claim 29, in which the size of the particulate carbonaceous material is up to 40 mm.

31. The cell of claim 30, wherein the size of the particulate carbonaceous material ranges from 1 micrometer to 30 mm.

32. The cell of claim 22, in which at least part of the particulate carbonaceous material, and/or the binder and/or the filler is fibrous.

33. The cell of claim 22, in which the ramming paste consists essentially of 50 to 99 weight % of carbonaceous materials, 0 to 30 weight % of fillers and 1 to 30 weight % of the binder.

34. The cell of claim 33, wherein said carbonaceous material is present at a level from 50 to 95% and wherein said binder is present at a level from about 5 to 30%.

35. The cell of claim 33, in which the filler is selected from the group consisting of aluminium, alumina or a mixture of aluminium and alumina, and the binder consists essentially of colloidal alumina and/or colloidal aluminium monophosphate.

36. The cell of claim 22, in which the ramming paste consists essentially of 50 to 98 weight % of carbonaceous materials, 1 to 60 weight % of fillers and 1 to 30 weight % of the binder.

37. The cell of claim 36, in which the ramming paste consists essentially of 50 to 90% carbonaceous materials, said filler consisting essentially of metallic aluminum and wherein said binder is present at a level of 5 to 30%.

38. The cell of claim 22, in which the ramming paste consists essentially of 50 to 90 weight % of carbonaceous materials, 1 to 60 weight % of fillers and 1 to 30 weight % of the binder.

39. The cell of claim 38, wherein said carbonaceous material is present at a level from 50 to 95%, wherein said filler consists essentially of metallic aluminium at a level from 40 to 60% and wherein said binder is present at a level from 5 to 30%.

40. The cell of claim 22, in which the components joined by the ramming paste are carbon blocks.

41. The cell of claim 40, in which the carbon blocks form a cathode, which is provided with a coating of an aluminium-wettable refractory material, on a surface which contacts molten aluminium during use of said cell.

42. A carbon containing ramming paste for use in joining components of electrolytic cells for the electrolysis of alumina for the production of aluminium, consisting essentially of a compact mixture of one or more particulate carbonaceous material(s) with a binder selected from the group consisting of colloidal silica, alumina, yttria, ceria, thoria, zirconia, magnesia, lithia and hydroxides, acetates and formates thereof as well as oxides and hydroxides of other metals, cationic species, colloidal aluminium monophosphate, pitch, tar and similar carbonaceous binder, and optionally with one or more fillers.

43. The ramming paste of claim 42, wherein said binder is present at a level of 1 to 6%.

44. The ramming paste of claim 43, wherein said binder is present at a level from 1 to 3%.

45. An electrolytic cell for the electrolysis of alumina for the production of aluminium, comprising at least two cell components joined by a ramming paste consisting essentially of a compact mixture of one or more particulate carbonaceous material(s) with a binder selected from the group consisting of colloidal silica, alumina, yttria, ceria, thoria, zirconia, magnesia, lithia and hydroxides, acetates and formates thereof as well as oxides and hydroxides of other metals, cationic species, colloidal aluminium monophosphate, pitch, tar and similar carbonaceous binder, and optionally with one or more non-carbonaceous fillers.

46. The cell of claim 45, wherein said binder is present at a level of 1 to 6%.

47. The cell of claim 46, wherein said binder is present at a level from 1 to 3%.

* * * * *